United States Patent
Goyal et al.

(10) Patent No.: US 10,540,389 B2
(45) Date of Patent: Jan. 21, 2020

(54) SOCIAL MEDIA DRIVEN COGNITIVE Q AND A ABOUT IMAGES

(71) Applicant: International Business Machines Corporation, Armonk, NY (US)

(72) Inventors: Munish Goyal, Yorktown Heights, NY (US); Kimberly Greene Starks, Nashville, TN (US); Wing L. Leung, Austin, TX (US); Sarbajit K. Rakshit, Kolkata WB (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 15/430,955

(22) Filed: Feb. 13, 2017

(65) Prior Publication Data
US 2018/0232399 A1 Aug. 16, 2018

(51) Int. Cl.
G06F 17/30 (2006.01)
G06F 16/583 (2019.01)

(52) U.S. Cl.
CPC .................... G06F 16/583 (2019.01)

(58) Field of Classification Search
None
See application file for complete search history.

(56) References Cited

U.S. PATENT DOCUMENTS

| | | | |
|---|---|---|---|
| 8,224,178 B2 * | 7/2012 | Keane | H04N 1/00244 348/14.02 |
| 8,965,967 B2 | 2/2015 | Gilbert et al. | |
| 9,098,532 B2 * | 8/2015 | Cragun | G06F 17/30247 |
| 9,374,399 B1 * | 6/2016 | Lin | G06Q 30/02 |
| 9,384,519 B1 * | 7/2016 | Tripp | G06F 17/30271 |
| 2010/0333127 A1 | 12/2010 | Scott et al. | |
| 2013/0224714 A1 | 8/2013 | Ajmera et al. | |
| 2013/0339437 A1 * | 12/2013 | De Armas | G06F 17/30274 709/204 |
| 2014/0280226 A1 * | 9/2014 | Wilson | G06N 3/063 707/748 |
| 2016/0006775 A1 | 1/2016 | Baldwin et al. | |
| 2016/0019411 A1 * | 1/2016 | Bart | G06K 9/00221 382/118 |
| 2016/0019812 A1 | 1/2016 | Barkan et al. | |
| 2016/0314145 A1 * | 10/2016 | Peck | G06F 16/434 |
| 2017/0169495 A1 * | 6/2017 | Rathus | G06F 17/30864 |
| 2017/0193533 A1 * | 7/2017 | Lai | G06Q 30/0202 |
| 2017/0331954 A1 * | 11/2017 | Kotnis | H04M 3/5116 |
| 2018/0181832 A1 * | 6/2018 | Wu | G06F 16/583 |

* cited by examiner

*Primary Examiner* — Debbie M Le
(74) *Attorney, Agent, or Firm* — Garg Law Firm, PLLC; Rakesh Garg; James Nock

(57) ABSTRACT

Using a set of characteristics of a posted image, data from a social media platform is searched for a set of related images, a related image having at least a subset of the set of characteristics. For a related image in the set of related images, information corresponding to the related image is processed to extract an additional information that is usable with the posted image. An image-specific knowledgebase associating with the posted image, the knowledgebase including the additional information. In response to a query relative to the posted image, an answer is computed according to a classification of the query using the knowledgebase.

20 Claims, 6 Drawing Sheets

SOCIAL MEDIA DRIVEN COGNITIVE Q AND A ABOUT IMAGES

TECHNICAL FIELD

The present invention relates generally to a method, system, and computer program product for providing additional information about images. More particularly, the present invention relates to a method, system, and computer program product for social media driven cognitive Q and A about images.

BACKGROUND

Hereinafter, a digital image is interchangeably referred to as simply a "picture" or an "image" unless expressly disambiguated where used. An image is "posted" to social media when a user ("posting user") makes the image available to one or more other users of the social media platform.

It is common for users to post images on social media for sharing with other users. Some posted images are available to any user of a given social media platform, or even to users outside the social media platform. Some posted images are available to a group of users in the posting user's social network.

Presently, some information is associated with an image in the form of image metadata. The metadata includes information such as filename, image size, date and time the image was captured, geographical location where the image was captured, copyright or source information, and the like. Presently, the metadata is prepopulated in the image file, remains static or unchanging once associated with the image, and controlled by the publisher of the image. A posting user can be, but need not be, the publisher of a posted image, and the posting user may or may not be able to modify the metadata of the posted image.

SUMMARY

The illustrative embodiments provide a method, system, and computer program product. An embodiment includes a method that searches, using a set of characteristics of a posted image, data from a social media platform for a set of related images, a related image having at least a subset of the set of characteristics. The embodiment processes, for a related image in the set of related images, information corresponding to the related image, to extract an additional information that is usable with the posted image. The embodiment associates with the posted image, an image-specific knowledgebase, the knowledgebase comprising the additional information. The embodiment computes, responsive to a query relative to the posted image, an answer according to a classification of the query using the knowledgebase.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
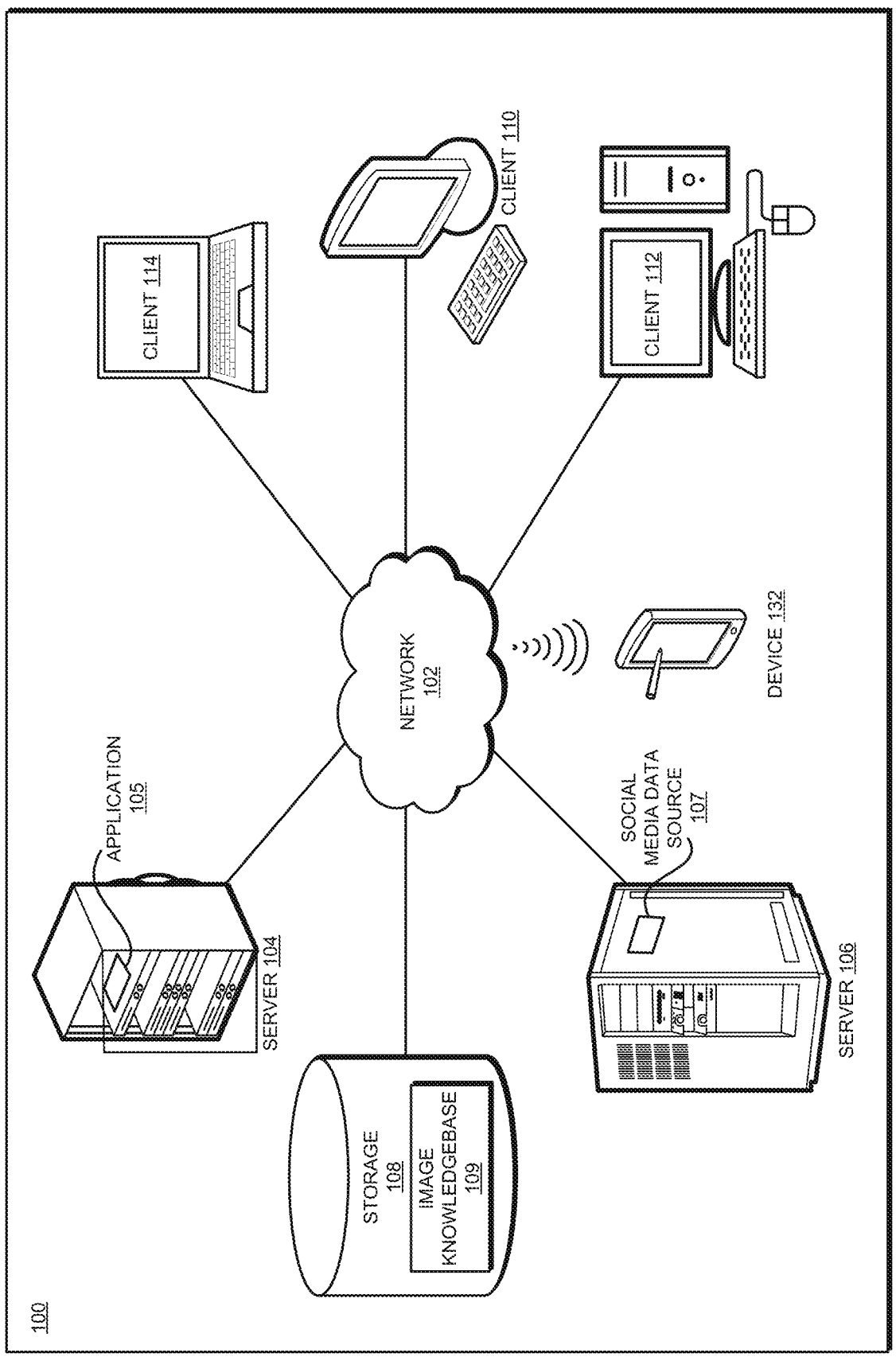
FIG. 1 depicts a block diagram of a network of data processing systems in which illustrative embodiments may be implemented.

The illustrative embodiments recognize that users often desire more information about a posted image. For example, a posting user may post an image that was captured during a trip. Other users, including but not limited to users in the posting user's social network, may want to know where the picture was taken, what the user did while there, who the user was with at that place, what an object that is visible in the posted image might be, the reason for how or why something appears in or is apparent from the image, and the like.

Generally, a user may have a query relative to a posted image. The query might be in the form of a question, such as in the examples above, or in the form of a need or request for more information associated with the posted image, e.g., to educate oneself about a place, person, or thing depicted in the image.

Some of the queries can be general in nature, such that the requested information is not personally associated with any particular user—including but not limited to the posting user. Some examples of such general queries are the questions or requests about the place or objects in the image.

Some of the queries can be personal in nature, such that the requested information is personally associated with a particular user—including but not limited to the posting user. Some examples of such personal queries are the questions or requests about the people in the image, or people who were accompanying the posting user when the image was captured, queries about the health or other personal concern of an individual who may be portrayed in the image, may be present at the time of the capturing of the image, or may be the capturer of the image, the posting user, or someone else.

The illustrative embodiments recognize that in many cases, one posted image from one posting user has some resemblance to other images posted by other users on a social media platform. For example, other users can also post similar images of the same place, person, thing, or event, as in the posted image, but those other images might be captured at different times, by different users, using different equipment, from different perspectives or distances, or generally under different circumstances.

The illustrative embodiments recognize that often similar queries are made relative to similar images. Particularly, on a social media platform, different posted images that are similar in some respect receive similar questions, and someone provides the requested information. For example, user A might post an image of a national park, and a friend of user A might ask why a net is stretched across a portion of the park in the image. User A, or another friend of user A might respond with an answer relative to user A's posted image, that the net prevents animals from reaching inhabited areas.

Now when user B visits the same national park, captures an image in which a similar net is visible, a friend of user B might ask a similar question about the net. Presently, user B or someone else has to answer the question anew relative to user B's posted image.

The illustrative embodiments further recognize that such information can be useful in conjunction with other similar pictures captured at that national park, by numerous other visitors, at different times or visits. The illustrative embodiments further recognize that such information is not a part of the image metadata, not limited to a publisher's control, not static, and can be unlimited in size or type.

For example, some user might provide not only the reason for the example net, but also a historical account of animal attacks and other failed restraining methods before the nets were put in place. Furthermore, such information may be in the form of text, other images, audio, video, graphics, animation, or in other forms. As more users provide more information about the nets appearing in similar images, such information is additive, and can be enriching to a user who is requesting information, or is simply curious about the net in a particular posted image. Presently, there exists no mechanism to associate such information, which is obtainable from social media, with images that pare posted on social media, in a flexible, dynamic, automatic manner.

The illustrative embodiments recognize that the presently available tools or solutions do not address these needs or provide adequate solutions for these needs. The illustrative embodiments used to describe the invention generally address and solve the above-described problems and other problems related to social media driven cognitive Q and A about images.

An embodiment can be implemented as a software application. The application implementing an embodiment can be configured as a modification of an existing social media platform and/or cognitive system, as a separate application that operates in conjunction with an existing social media platform and/or cognitive system, a standalone application, or some combination thereof.

An embodiment detects that an image has been posted or otherwise made available on a social media platform. The embodiment analyzes the image to compute a set of characteristics of the posted image. For example, a subset of characteristics may identify various people, places, objects, or events portrayed in the image. Another example subset of characteristics may identify the season, time, and other ambient conditions evident from the image. Another example subset of characteristics may identify the activities occurring in the image.

These examples of characteristics are not intended to be limiting. From this disclosure, those of ordinary skill in the art will be able to conceive many other image characteristics and the same are contemplated within the scope of the illustrative embodiments.

An embodiment analyzes available social media data to locate a set of related images. A related image is an image that is related to a posted image by virtue of both images having at least a subset of image characteristics that are similar, or have similar values within a tolerance.

As in the example of the national park image described herein, when user A posts an image of a portion of the park depicting a net, the embodiment identifies as related images an image posted by user B, an image posted by user C, and so on, where each of the related images might depict different people, different seasons, different circumstances, but depict similar nets present in the park. The related images might not even show the same net (or other artifact), but a similar net (or artifact).

The embodiment further analyzes the information available from the social media platform relative to a related image. For example, a friend of user B may have asked a question, requested additional information, or expressed a curiosity about the related image posted by user B, and user B may have provided the requested information. The embodiment analyzes the request and the provided information that correspond to the related image. The analysis may be any suitable analysis depending upon the form, language, context, and other factors of the request and the provided information.

The analysis of the requests, questions, and provided information may, for example, utilize Natural Language Processing (NLP) to make the additional information consumable by a cognitive system. A cognitive system is also known as a Q and A system, which is trained to accept a question pertaining to a subject-matter domain, and use a supplied knowledgebase, e.g., corpora of subject-matter domain-related knowledge, to compute an answer to the question.

The analysis of the requests, questions, and provided information results in additional information that its usable with a posted image, e.g., user A's posted image in the national park example. The analysis according to an embodiment further separates or classifies generalized additional information and personalized additional information.

Generalized additional information about a posted image is additional information that is not personally associated with any particular user—including but not limited to the posting user. For example, "what is the use for that net?" is an example general query about a net in an example posted image, and "prevent animals from accessing an inhabited area" is an example generalized additional information pertaining to the net in the posted image.

Personalized additional information is personally associated with a particular user—including but not limited to the posting user. For example, "did you go there with Jane Doe?" is an example personal query about a person in an example posted image, and "Jane does not like natural surroundings" is an example personalized additional information pertaining to the net in the posted image.

In one embodiment, information of certain types, even when associated with a person, are regarded as generalized additional information. In another embodiment, who provided the information on which the additional information is based determines whether the information is generalized or personalized. For example, if user A posted an image, information obtained from an answer in response to user B's related image may be regarded as generalized additional information, but information obtained from an answer by a friend of user A in response to user A's posted image may be regarded as personalized additional information additional information.

These examples of classifying additional information as generalized or personalized are not intended to be limiting. From this disclosure, those of ordinary skill in the art will be able to conceive many other ways of similar classification, and the same are contemplated within the scope of the illustrative embodiments.

An embodiment maintains a repository of image-specific additional information. Hereinafter, a reference to a knowledgebase or an image knowledgebase is a reference to such a repository. The image knowledgebase stores the additional information items, and the types associated with each additional information items, as they relate to a particular image. In one embodiment, an image knowledgebase can be associated with more than one posted image, such as with a set of images that share a subset of common characteristics.

In one embodiment, the image knowledgebase is stored at a location from where a cognitive system can access the knowledgebase and answer a query relative to the corresponding posted image. In another embodiment, the image knowledgebase may be included in the data of the posted image. In another embodiment, the image file or image data may include a reference to the image knowledgebase.

These examples of manners of associating a posted image with a corresponding image-specific image knowledgebase are not intended to be limiting. From this disclosure, those of ordinary skill in the art will be able to conceive many other ways of forming such an association and the same are contemplated within the scope of the illustrative embodiments.

An association between a posted image and a corresponding knowledgebase allows a cognitive system to access the knowledgebase when a query is received relative to the posted image in response to which an answer or information has to be provided automatically without the intervention of the posting user. As other related images appear on the social media platform, and as additional questions, requests, answers, and other information becomes available on the social media platform, an embodiment finds the newly posted related images and such information, analyzes the information in a manner described herein, and adds, removes, or modifies additional information in the image knowledgebase of a posted image.

An embodiment detects or receives a query for additional information about a posted image. The embodiment determines, by using cognitive computing, whether the query is a question being asked to the posting user, or a request for additional information from whoever having access to the posted image can provide such information.

In case of a request for additional information, the embodiment further determines whether the request is a general request or a personal request. A general query—whether a request or a question—can be answered using only generalized additional information. A personalized query—whether a request or a question—can be answered using either generalized additional information, or personalized additional information, or both.

The embodiment determines if suitable additional information is available according to the classification of the request. The cognitive system is used to compute a suitable answer from the additional information in the appropriate classification or classifications, as the case may be. The embodiment provides the computed answer in response to the request.

For example, if a user were viewing a posted image, a request can be made or assumed inherently for additional information that might be useful to the user in understanding the image. Depending on the user's identity and privilege relative to the posted image, a computed answer can be presented to the user together with the posted image automatically, and without the user having to overtly make any requests.

In case of a question, the embodiment further determines whether the question is a general question or a personal question. The embodiment determines if suitable additional information is available according to the classification of the question. The cognitive system is used to compute a suitable answer to the question using the additional information in the appropriate classification or classifications, as the case may be. The embodiment provides the computed answer in response to the question.

The manner of social media driven cognitive Q and A about images described herein is unavailable in the presently available methods. A method of an embodiment described herein, when implemented to execute on a device or data processing system, comprises substantial advancement of the functionality of that device or data processing system in using information provided by other users relative to other images, and responding to queries about a posted image automatically without requiring any action on the part of the posting user.

The illustrative embodiments are described with respect to certain types of images, artifacts, objects, social media, requests, questions, information, additional information, classifications, knowledgebases, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
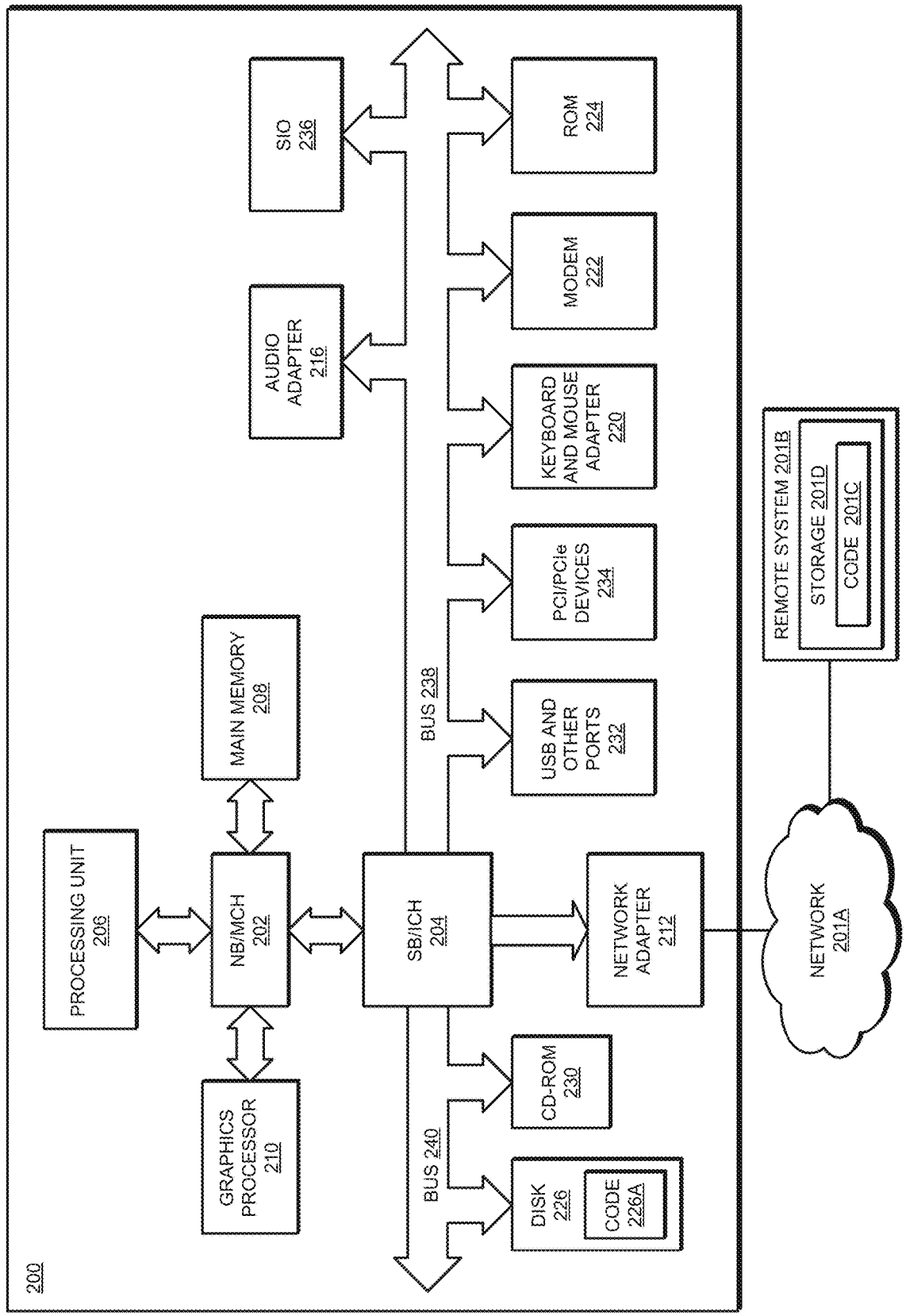
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Detects a posted image and searches for related images using social media data source 107, which is a data source associated with a social media platform. Application 105 analyzes the social media data from source 107 to create additional information about a posted image and populate the additional information in image knowledgebase 109. Knowledgebase 109 is depicted in external storage 108 only as one non-limiting example. Other configurations are possible, as described herein.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
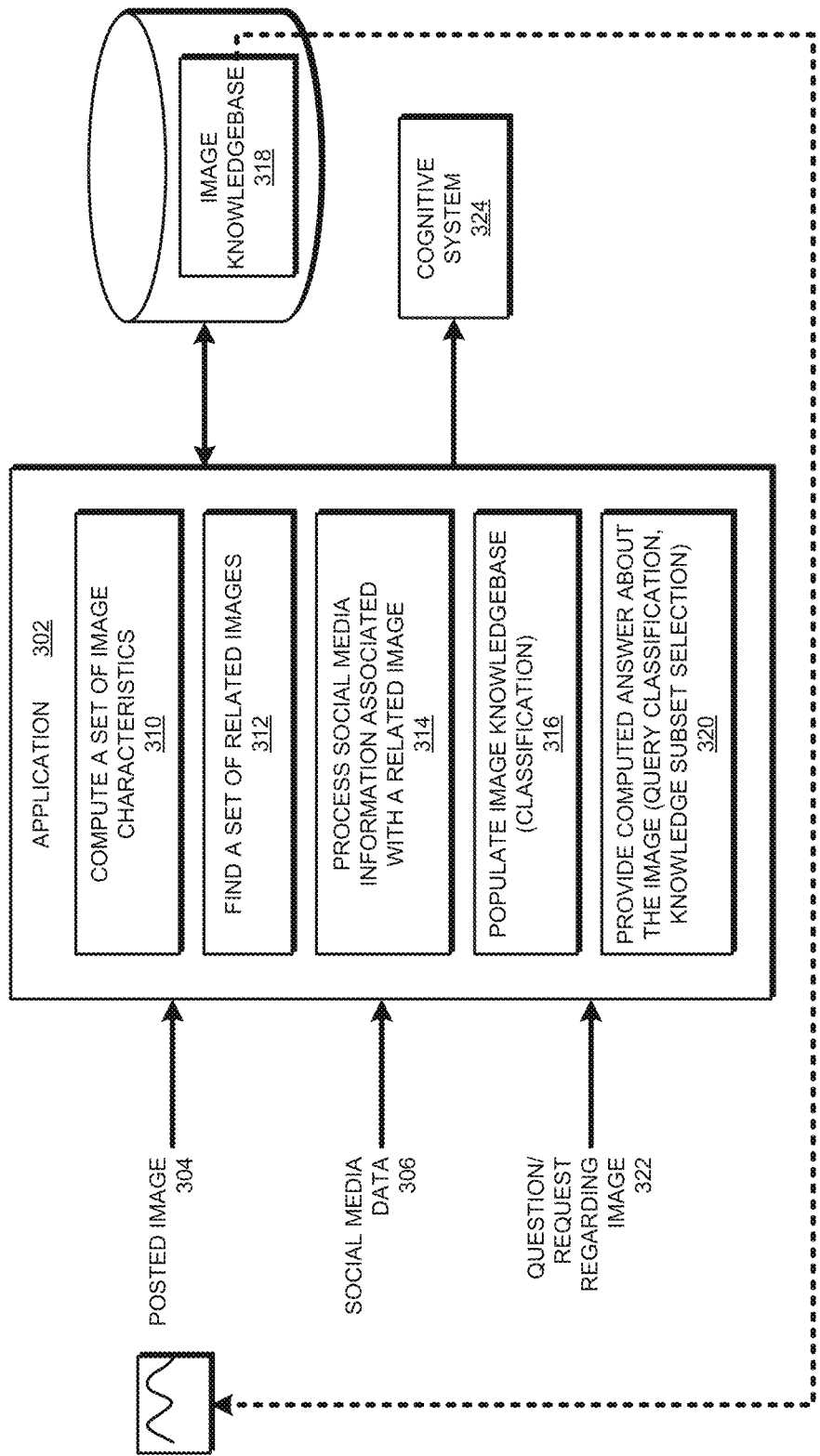
FIG. 3 depicts a block diagram of an example configuration for social media driven cognitive Q and A about images in accordance with an illustrative embodiment.

With reference to FIG. 3, this figure depicts a block diagram of an example configuration for social media driven cognitive Q and A about images in accordance with an illustrative embodiment. Application 302 is an example of application 105 in FIG. 1. Posted image 304 is as described herein. Social media data 306 is an example of data obtained from social media data source 107 in FIG. 1.

Component 310 computes a set of image characteristics for posted image 304. Component 312 searches data 306 to find a set of related images using the set of characteristics computed by component 310.

Component 314 processes data 306 to identify the information, e.g., the questions, requests, and answers or descriptions provided by users, relative to a related image. Component 314 performs this processing for any number of related images found by component 312. In one embodiment, the processing of component 314 uses NLP to process and construct additional information, as described herein.

Component 316 populates image knowledgebase 318 with eth additional information computed by component 314. Component 316 also determines a classification for an item of additional information and populates the item in knowledgebase 318 along with the classification, as described herein. Component 316 also associates knowledgebase 318 with posted image 304 in one or more ways, as described herein.

Component 320 receives or detects query 322 relative to posted image 304. For example, query 322 may be a question regarding an aspect of posted image 304; or may be a request for posted image 304 itself, request for additional information about posted image 304, or some other kind of request related to posted image 304, as described herein.

Component 320 analyzes query 322 and a classification of query 322. Using cognitive system 324 and image knowledgebase 318, component 320 provides a computed answer that is based on additional information of the appropriate classification and is responsive to query 322.

Figure 4:
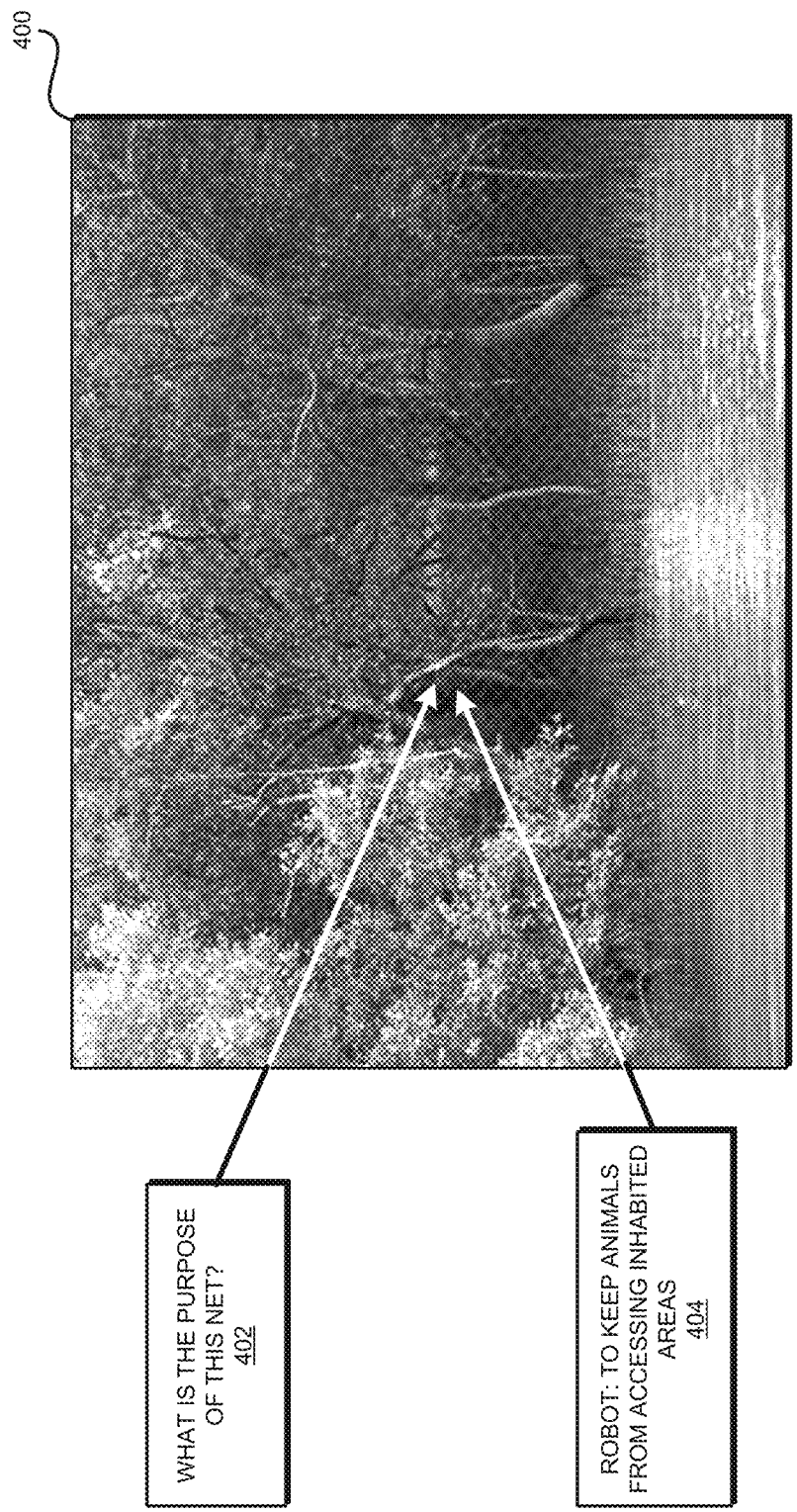
FIG. 4 depicts an example operation of social media driven cognitive Q and A about images in accordance with an illustrative embodiment.

With reference to FIG. 4, this figure depicts an example operation of social media driven cognitive Q and A about images in accordance with an illustrative embodiment. Image 400 is an example of posted image 304.

Suppose that a user asks question 402, "what is the purpose of this net?" Question 402 is an example of query 322 in FIG. 3. Application 302 in FIG. 3, e.g., by an operation of component 320, computes answer 404 and provides answer 404 in response to question 402 without any action being required from the posting user. An additional information item that is used in computing answer 404 may have been obtained from an answer provided by some other user in connection with a related image someone else posted on social media.

Figure 5:
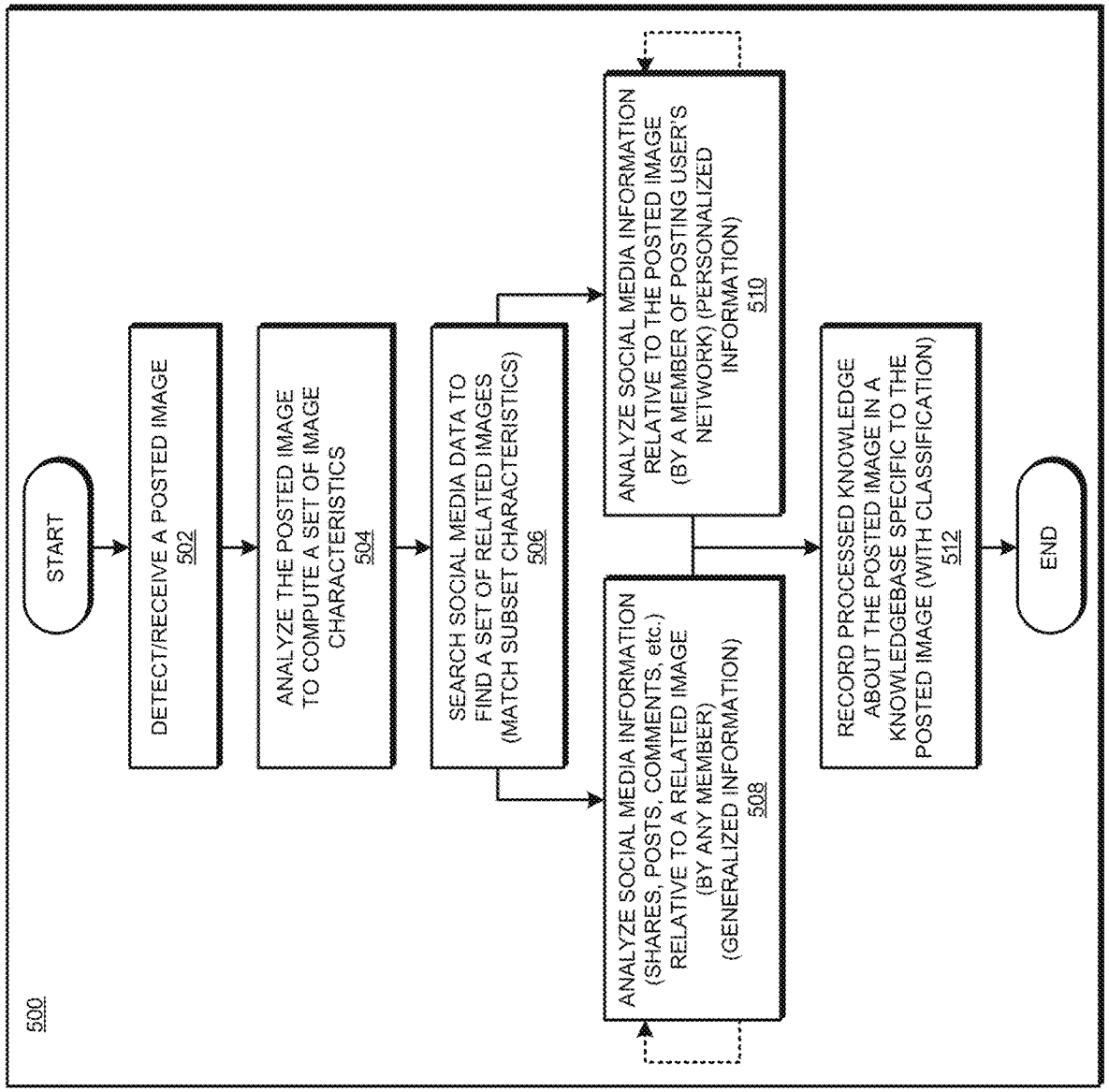
FIG. 5 depicts a flowchart of an example process for constructing an image knowledgebase from social media data in accordance with an illustrative embodiment.

With reference to FIG. 5, this figure depicts a flowchart of an example process for constructing an image knowledgebase from social media data in accordance with an illustrative embodiment. Process 500 can be implemented in application 302 in FIG. 3.

The application detects or receives a posted image (block 502). The application analyzes the posted image to compute a set of image characteristics (block 504). The application searches social media data to find a set of related images, such that each related image matches at least a subset of the image characteristics of the posted image, within a tolerance (block 506).

The application analyzes social media information, e.g., shares, comments, posts, etc., relative to a related image (block 508). The social media information analyzed in block 508 can be from any social media user, not limited to the social network of the posting user of the posted image. Social media information available from any social media user, for analysis in block 508, is regarded as generalized information. The additional information item(s) resulting from such generalized information are classified as generalized information, except that certain information that may be regarded as personalized according to a policy.

The application analyzes social media information, e.g., shares, comments, posts, etc., relative to the posted image (block 510). The social media information analyzed in block 510 is from a social media user who is a member of the social network of the posting user of the posted image. Social media information available from such a social media user, for analysis in block 510, is regarded as personalized information. The additional information item(s) resulting from such generalized information are classified as personalized information, except that certain information that may be regarded as generalized according to a policy.

The application records the processed knowledge, i.e., the additional information items, about the posted image in a knowledgebase that its specific to the posted image (block 512). The application ends process 500 thereafter.

Figure 6:
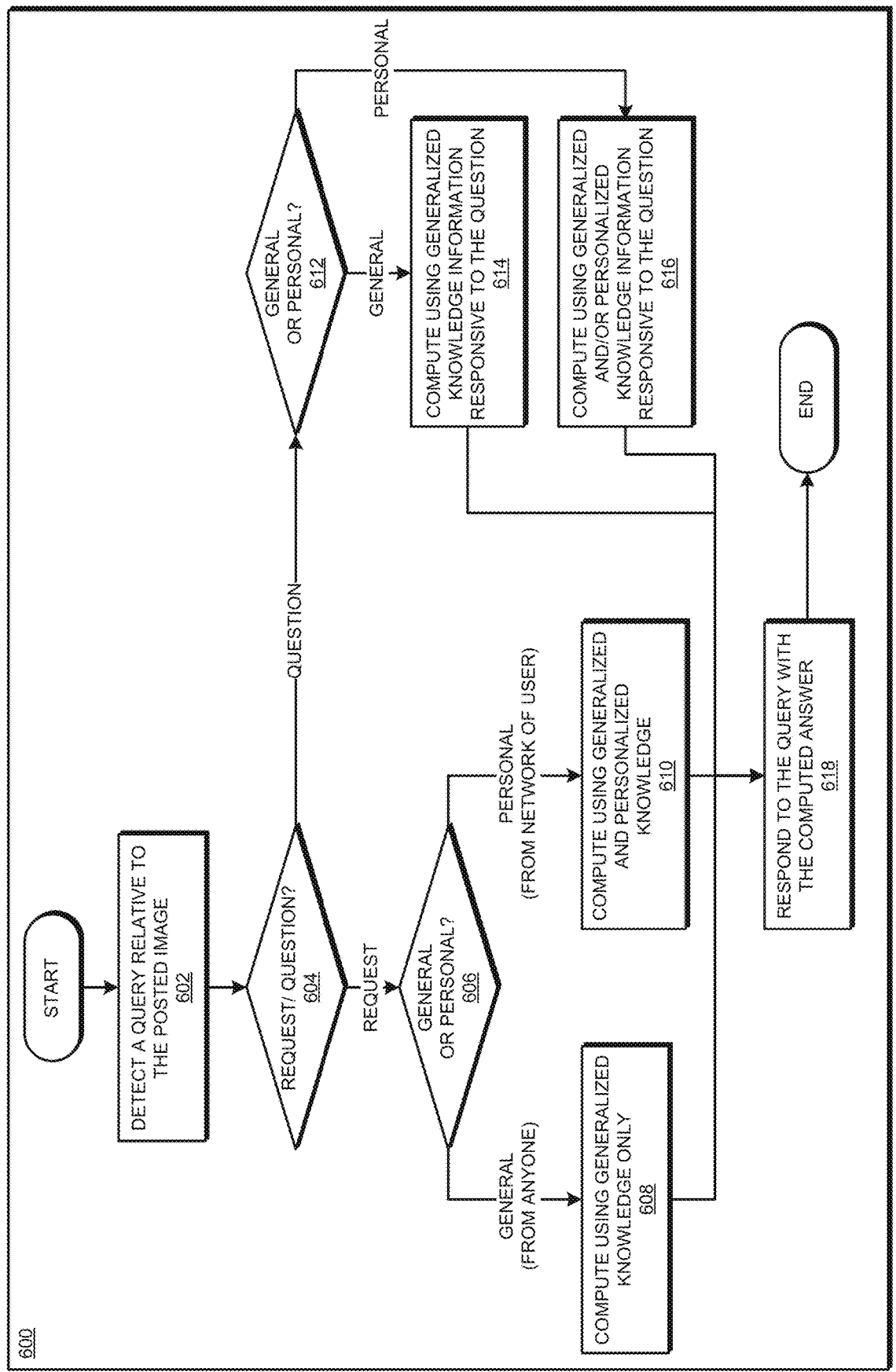
FIG. 6 depicts a flowchart of an example process for using an image knowledgebase in cognitive Q and A about a posted image in accordance with an illustrative embodiment.

With reference to FIG. 6, this figure depicts a flowchart of an example process for using an image knowledgebase in cognitive Q and A about a posted image in accordance with an illustrative embodiment. Process 500 can be implemented in application 302 in FIG. 3.

The application detects a query relative to a posted image, e.g., the posted image detected in block 502 in FIG. 5 (block 602). The application determines, e.g., through NLP or other methods, whether the query is a request for additional information or a question about the posted image (block 604). For example, a user trying to load the posted image may trigger an inherent request for additional information to be presented with the posted image. As another example, another user might expressly request more information in a non-question form about the posted image after the posted image has loaded. As another example, another user might ask a specific question related to the posted image.

If the query is a request ("Request" path of block 604), the application determines whether the request is a general request or a personal request (block 606). For example, is the user requesting general information about the national park—a general request—or is the user trying to find out the identity of the user who captured the picture—a personal request.

If the request is a general request ("General" path of block 606), the application computes a response, such as by configuring the cognitive system to use only the generalized knowledge in the image knowledgebase (block 608). If the request is a personal request ("Personal" path of block 606), the application computes a response, such as by configuring the cognitive system to use the generalized knowledge as well as the personalized knowledge in the image knowledgebase (block 610). The application proceeds to block 618 thereafter.

If the query is a question ("Question" path of block 604), the application determines whether the question is a general question or a personal question (block 612). For example, is the user asking for a non-person-specific information or is the user asking for a person-specific information.

These examples of rules or conditions for determining whether a request or question is general or personal are not intended to be limiting. From this disclosure, those of ordinary skill in the art will be able to conceive many other rules or conditions for determining whether a request or question is general or personal and the same are contemplated within the scope of the illustrative embodiments.

If the question is a general question ("General" path of block 612), the application computes an answer, such as by configuring the cognitive system to use only the generalized knowledge in the image knowledgebase in producing an answer that is responsive to the question (block 614). If the question is a personal question ("Personal" path of block 612), the application computes an answer, such as by configuring the cognitive system to use the generalized knowledge as well as the personalized knowledge in the image knowledgebase, and producing an answer that is responsive to the question (block 616). The application then responds to the query of block 602 with the computed answer (block 618). The application ends process 600 thereafter.

Thus, a computer implemented method, system or apparatus, and computer program product are provided in the illustrative embodiments for social media driven cognitive Q and A about images and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
searching, using a set of characteristics of a posted image, data from a social media platform for a set of related images, a related image having at least a subset of the set of characteristics;
processing, for a related image in the set of related images, information corresponding to the related image, to extract an additional information that is usable with the posted image;
associating with the posted image a reference to an image-specific knowledgebase, the knowledgebase comprising the additional information; and
computing, responsive to a query relative to the posted image, the query comprising a question regarding an aspect of the posted image or a request for additional information about the posted image, an answer according to a classification of the query using the knowledgebase.

2. The method of claim 1, further comprising:
detecting that the posted image is being loaded by a user, wherein the query is inherent in the loading;
determining that the user does not have a privilege for personalized information; and
causing the computing to use only that additional information which has a general classification in the knowledgebase.

3. The method of claim 1, further comprising:
receiving the query from a user, wherein the query is a question posted on the social media network;
determining that the user has a privilege for personalized information; and
causing the computing to use additional information which has a general classification in the knowledgebase and additional information which has personal classification in the knowledgebase.

4. The method of claim 1, further comprising:
determining that the information corresponding to the related image is provided by a user who is not in a social network of a posting user of the posted image;
further determining that the information corresponding to the related image is not usable to identify a person; and
associating with the additional information, a general classification.

5. The method of claim 1, further comprising:
determining that the information corresponding to the related image is provided by a user who is in a social network of a posting user of the posted image;
further determining that the information corresponding to the related image is usable to identify a person; and
associating with the additional information, a personal classification.

6. The method of claim 1, further comprising:
storing the knowledgebase in a remote repository, wherein the computing access the remote repository to compute the answer.

7. The method of claim 1, further comprising:
storing the knowledgebase in the posted image, wherein the computing access the knowledgebase within the posted image to compute the answer.

8. The method of claim 1, further comprising:
storing a reference to the knowledgebase in the posted image, wherein the computing access the knowledgebase using the reference in the posted image to compute the answer.

9. The method of claim 1, wherein the knowledgebase is applicable to only the posted image.

10. The method of claim 1, wherein the knowledgebase is applicable to a set of images, wherein an image in the set of images have at least a subset of characteristics in common with the posted image.

11. The method of claim 1, wherein the information is a part of the social media data.

12. The method of claim 1, wherein the information corresponding to the related image is text, wherein the processing uses Natural Language Processing (NLP) to extract the additional information, and wherein the additional information is associated with the posted image in textual form.

13. The method of claim 1, wherein the information corresponding to the related image is another image, wherein the processing comprises image processing to extract the additional information, and wherein the additional information is associated with the posted image in image form.

14. The method of claim 1, wherein the information corresponding to the related image comprises information in audio form, wherein the processing comprises audio processing to extract the additional information, and wherein the additional information is associated with the posted image in the audio form.

15. The method of claim 1, wherein the information corresponding to the related image comprises information in animation form, wherein the processing comprises graphical processing to extract the additional information, and wherein the additional information is associated with the posted image in the animation form.

16. The method of claim 1, further comprising:
detecting a posting operation that makes posted image available on the social media platform; and
analyzing the posted image to compute the set of characteristics.

17. A computer usable program product comprising one or more computer-readable storage devices, and program instructions stored on at least one of the one or more storage devices, the stored program instructions comprising:
program instructions to search, using a set of characteristics of a posted image, data from a social media platform for a set of related images, a related image having at least a subset of the set of characteristics;

program instructions to process, for a related image in the set of related images, information corresponding to the related image, to extract an additional information that is usable with the posted image;

program instructions to associate with the posted image a reference to an image-specific knowledgebase, the knowledgebase comprising the additional information; and program instructions to compute, responsive to a query relative to the posted image, the query comprising a question regarding an aspect of the posted image or a request for additional information about the posted image, an answer according to a classification of the query using the knowledgebase.

18. The computer usable program product of claim 17, wherein the computer usable code is stored in a computer readable storage device in a data processing system, and wherein the computer usable code is transferred over a network from a remote data processing system.

19. The computer usable program product of claim 17, wherein the computer usable code is stored in a computer readable storage device in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to search, using a set of characteristics of a posted image, data from a social media platform for a set of related images, a related image having at least a subset of the set of characteristics;

program instructions to process, for a related image in the set of related images, information corresponding to the related image, to extract an additional information that is usable with the posted image;

program instructions to associate with the posted image a reference to an image-specific knowledgebase, the knowledgebase comprising the additional information; and program instructions to compute, responsive to a query relative to the posted image, the query comprising a question regarding an aspect of the posted image or a request for additional information about the posted image, an answer according to a classification of the query using the knowledgebase.

* * * * *